(12) United States Patent
Stewart et al.

(10) Patent No.: US 6,403,755 B1
(45) Date of Patent: Jun. 11, 2002

(54) POLYESTERS CONTAINING PHOSPHAZENE, METHOD FOR SYNTHESIZING POLYESTERS CONTAINING PHOSPHAZENES

(75) Inventors: Frederick F. Stewart; Thomas A. Luther; Mason K. Harrup, all of Idaho Falls, ID (US)

(73) Assignee: The United States of America as represented by the Department of Energy, Washington, DC (US)

(*) Notice: Subject to any disclaimer, the term of this patent is extended or adjusted under 35 U.S.C. 154(b) by 0 days.

(21) Appl. No.: 09/799,578

(22) Filed: Mar. 7, 2001

(51) Int. Cl.[7] .................. C08G 63/68; C08G 63/82
(52) U.S. Cl. ............ 528/287; 528/179; 528/190; 528/210; 528/211; 528/216; 528/219; 524/700; 524/765; 524/770

(58) Field of Search .................. 528/179, 190, 528/210, 211, 216, 219, 287; 524/770, 765, 700

(56) References Cited

U.S. PATENT DOCUMENTS

| | | | |
|---|---|---|---|
| 3,121,704 A | * 2/1964 | Rice et al. | 525/534 |
| 3,867,186 A | * 2/1975 | Hook et al. | 252/608 |
| 3,994,996 A | * 11/1976 | Franko-Filipasic et al. | 558/144 |
| 4,111,701 A | * 9/1978 | Franko-Fillipasic et al. | 106/15 FP |
| 4,321,217 A | * 3/1982 | Allcock et al. | 526/276 |
| 4,533,726 A | * 8/1985 | Myers | 528/332 |

* cited by examiner

*Primary Examiner*—Samuel A. Acquah
(74) *Attorney, Agent, or Firm*—Joy Alwan; Thomas G. Anderson; Paul A. Gottlieb

(57) ABSTRACT

A new phosphazene-based polyester macro-molecule is provided, as is a method for producing the macro-molecule.

16 Claims, 5 Drawing Sheets

Linear Polymer

Cyclolinear

Cyclomatrix

FIG 1

B: = Nitrogen Base

FIG 2A

+ HCO$_3^{1-}$

POLYESTERS CONTAINING PHOSPHAZENE, METHOD FOR SYNTHESIZING POLYESTERS CONTAINING PHOSPHAZENES

CONTRACTUAL ORIGIN OF THE INVENTION

The United States Government has rights in this invention pursuant to Contract No. DE-AC07-99ID13727 between the U.S. Department of Energy and Bechtel BWXT Idaho, LLC for management and operation of the Idaho National Engineering and Environmental Laboratory.

BACKGROUND OF THE INVENTION

1. Field of the Invention

This invention relates to a phosphazene material and a method for producing the material, and more specifically, this invention relates to a polyester incorporating a trimeric phosphazene material and a method for making the phosphazene-based polyester material.

2. Background of the Invention

Polyphosphazene polymers are a versatile class of hybrid organic-inorganic materials that have many remarkable properties. Soluble and hydrolytically stable phosphazene polymers have a variety of uses, including as membranes for the removal of water from aqueous solutions, for organic separations, and as solid polymer electrolytes. Additionally, they may be formed as water-soluble high polymers, or as non-flammable fluids.

The key to these phosphazene-based polymers is their solubility in certain solvents that allows for facile formation into useful materials such as thin dense films. The variety of applications that have been proposed for phosphazene polymers is a clear reflection of diversity of the chemistry that they possess.

The backbone of a phosphazene polymer consists of alternating phosphorus and nitrogen atoms with alternating double and single bonds. Phosphorus, in this configuration is pentavalent with two substituents on phosphorus. Initially, phosphazene linkages are formed from the condensation of phosphorus pentachloride and ammonium chloride that yields a colorless crystalline solid that is easily sublimed. Heating of this material yields an elastomer with an empirical formula of $PNCl_2$ that was originally termed "inorganic rubber". However, this rubber is hydrolytically unstable and evolves hydrochloric acid upon exposure to water. The polymer can be deliberately modified with organic nucleophiles via the labile chlorines. This strategy yields a variety of robust polymers and is still in widespread use.

Figure 1:
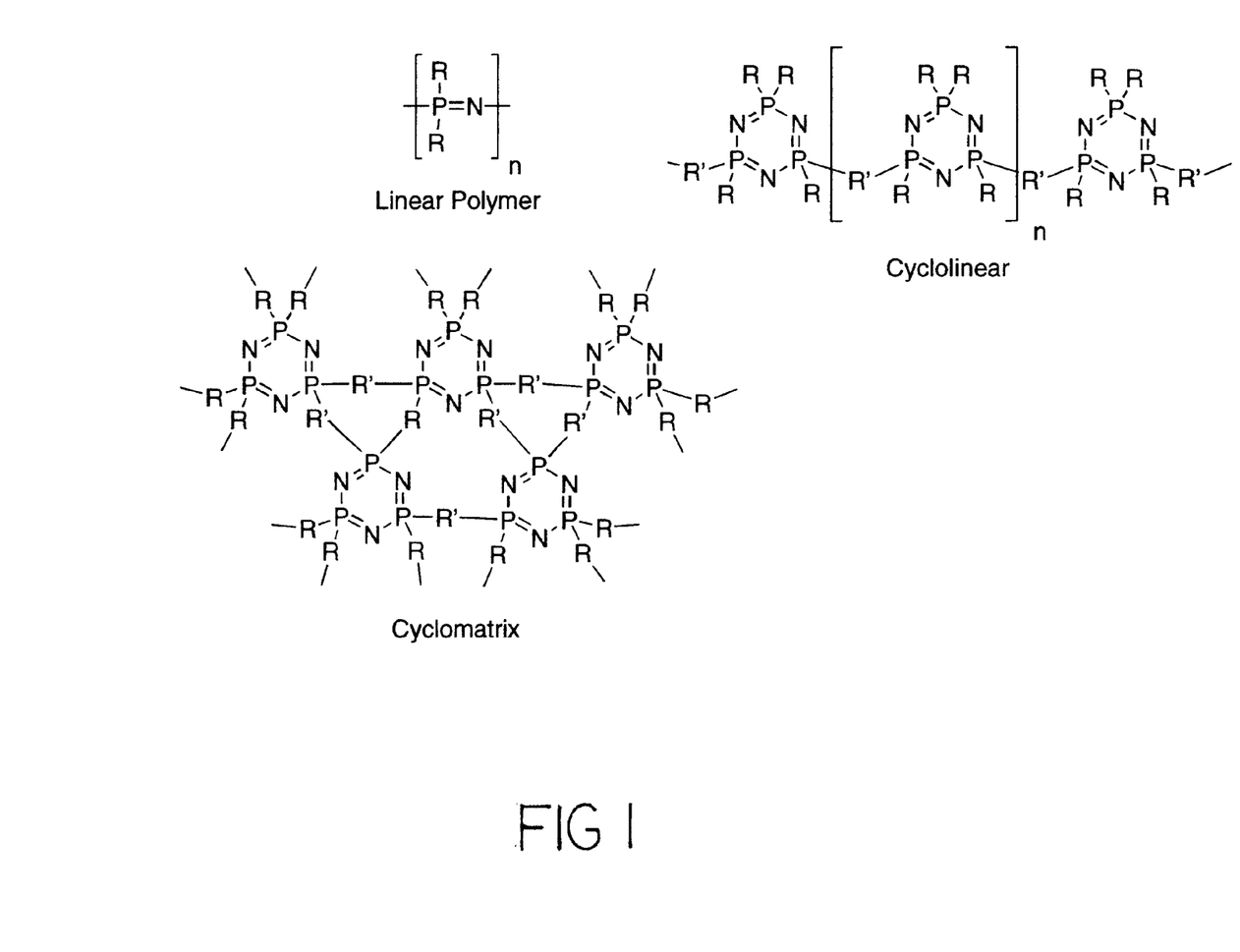
FIG. 1 is a depiction of a typical phosphazene molecule types.

Polymerization of phosphazene material potentially can be performed to yield three distinct backbone structures: linear, cyclolinear, and cyclomatrix, see FIG. 1. R and R' represent monodentate pendant groups and bidentate crosslinking groups, respectively. Of these structures, the linear configuration has been the most extensively studied. Cyclolinear structures have been the least studied due to the complexity of synthesis.

Cyclomatrix polyphosphazenes are more common than the cyclolinear structures as there are several synthetically accessible routes. Interest in cyclomatrix phospha-zenes is driven by the desire to reduce material cost while taking advantage of the inherent stability of the inorganic phosphazene backbone. They are potentially more useful materials than cyclolinear materials. For example, crosslinked hexa-[4-hydroxy-phenoxy]cyclotriphosphazene (FIG. 1) was found to react readily with hexamethylenetetraamine at 200° C. to yield a durable but intractable solid structural material. M. L. Stone, *Mat Res. Soc. Symp.*, 305, 85 (1993).

Uncrosslinked hexa-[4-hydroxyphenoxy]cyclotriphosphazene has been synthesized through a two-step protection-deprotection methodology. A. Medici, G. Fantin, P. Pedrini, M. Gleria, F. Minto *Macromolecules*, 25(10), 2569 (1992). This method entailed the synthesis of hexa-[4-methoxyphenoxy]cyclotriphosphazene and hexa-[4-phenoxyphenoxy]cyclotriphosphazene from hexachlorocyclotriphosphazene and the corresponding substituted phenol. Unmasking of the hydroxyl functionality was performed by hydrolysis of the corresponding alkyl or aromatic ether to yield an uncrosslinked trimeric building block.

An alternate one-step synthesis exists to produce the trimeric phosphazene material, wherein hexachlorocyclotriphosphazene is reacted with hydroquinone in the presence of pyridine. R. G. Rice, B. H. Geib, and L. A. Kaplan, U.S. Pat. No. 3,121,704 (1964). D. A Femec and R. R. McCaffrey, *J. Appl. Poly. Sci.*, 52, 501 (1994). As the reaction proceeds, the pyridine acts as a base for proton abstraction from the hydroquinone to produce the active nucleophile that displaces the labile chlorine on the phosphazene ring. However, characterization of this reaction via $^{31}P$ NMR spectroscopy revealed several peaks, suggesting inhomogeneous phosphorus speciation. This result is attributed to reaction of both hydroxyl sites on the hydroquinone resulting in a partially cross linked structure. Prevention of crosslinking by using an excess of hydroquinone was unsuccessful. Also, the requirement of hydroquinone is regrettable inasmuch as that chemical is carcino- genic.

U.S. Pat. No. 4,533,726 awarded to Myers et al on Aug. 6, 1985 discloses a polymeric reaction product incorporating phosphazene. However, that polymer exhibits hydrophilic properties and is not ideal for homogenization with nonpolar solvents.

U.S. Pat. Nos. 3,994,996 and 4,111,701 awarded to Franko-Filipasic on Nov. 30, 1976 and Sep. 5, 1978 respectively, discloses a liquid phase phosphazene-containing polymer. The polymer is combined with fibers to render the later fire resistant. The phosphazene units are linked together by an oxygen bridge connecting phosphorous atoms of neighboring units.

U.S. Pat. No. 3,867,186 awarded to Hook et al on Feb. 18, 1975 also discloses using phosphazene material as a flame retardant.

U.S. Pat. No. 4,321,217 awarded to Allcock et al on Mar. 23, 1982 discloses a method for attaching halogen directly to phosphorous on phosphazene via a metal intermediate. This method is designed to improve thermal and hydrolytic properties of phosphazene.

A need exists in the art for a phosphazene-based polyester and a method to produce the polyester. The polyester must be soluble in typical industrial solvents so as to facilitate the polyester's incorporation into membranes and other useful configurations. The material should not automatically polymerize during formation, nor should the method utilize known carcinogenic reactants.

SUMMARY OF THE INVENTION

An object of the present invention is to provide a phosphazene material and a method of forming phosphazene material that overcomes many of the disadvantages of the prior art.

Another object of the present invention is to provide a method for producing a macromolecule comprising cyclomatrix phosphazene subunits. A feature of the invention is that the phosphazene subunits are trimeric in nature. An advantage of the invention is that the trimeric nature of the molecule facilitates polymerization of the molecule only when the molecule is subjected to deliberate polymerization processes.

It is another object of the present invention to provide a method for using cyclomatrix phosphazene as a subunit in phosphazene-containing polyester molecules. A feature of the invention is the trimeric structure of the cyclomatrix phosphazene comprising a core, an aromatic region surrounding the core and an aliphatic moiety directed away from the core. An advantage of the trimeric structure is that additions to the structure are regio-specific and generally juxtaposed to the aliphatic moiety. Another advantage is that the aliphatic moiety donates electrons to the aromatic region, causing the region to become nucleophilic and therefore more reactive to the phosphazene core during formulation, resulting in higher yields and purer product.

Yet another object of the present invention is to form a polyester containing cyclomatrix phosphazene. A feature of the polyester is the existence of an aliphatic moiety attached to an aromatic moiety comprising the cyclomatrix phosphazene molecule. An advantage of the polyester is that it is fully soluble in common polar organic solvents such as acetone and tetrahydrofuran and therefore can be used as thin films in applications such as membranes.

Another object of the present invention is to provide a safer process for forming hexa [hydroxyphenoxy] phospbazene. A feature of the invention is the replacement of hydroquinone in typical cyclomatrix phosphazene production processes with a ten-fold excess of tert-butylhydroquinone. An advantage of this is the elimination of a suspected carcinogen from the production process.

A further object of the present invention is to form new cyclomatrix phosphazene-containing polyester polymers. A feature of the polymers is that they are formed from trimeric building blocks and varying length spacers between the building blocks. An advantage of the invention is that different spacer lengths confer different morphology to the resulting polyester.

Yet another object of the present invention is to provide new cyclomatrix phosphazene-containing polyester polymers. A feature of the invention is the incorporation of bidentate acid chlorides to provide ester couplings between trimeric phosphazene subunits, and organic spacers between phosphazene moieties. An advantage of the invention is that the utilization of the couplings and organic spacers accelerates the condensation reactions required for forming the polyesters. High yields result.

Still another object of the present invention is the utilization of phosphazene trimeric subunits to produce polyester macromolecules. A feature of the invention is that each subunit provides steric hindrance to prevent automatic oligomerization of the subunits. An advantage of the invention is that the subunit can be utilized in deliberate polymerization processes.

Briefly, the invention provides for a polyester comprising phosphazene molecules, an aromatic molecule attached to the phosphazene molecules and containing an alkyl moiety directed away from the molecules and an ester linking the phosphazene molecules to each other.

The invention also provides a method for synthesizing polyesters containing phosphazene comprising reacting hexa-(alkylhydroquinone)cyclotriphosphazene in a non-aqueous solvent with a bifunctional acyl halide. Generally, the bifunctional acyl halide is present in a molar ratio to the phosphazene of between 1.5:1 and 100:1.

BRIEF DESCRIPTION OF THE DRAWING

The invention together with the above and other objects and advantages will be best understood from the following detailed description of the preferred embodiment of the invention shown in the accompanying drawing, wherein.

DETAILED DESCRIPTION OF THE INVENTION

This invention discloses new pathways for the synthesis of soluble cyclomatrix polymers to be used as thin dense films. Generally, polyesters were synthesized via a polymerization reaction between hydroquinone-substituted phosphazene molecules and halides. In one specific protocol, polyesters containing novel cyclomatrix phosphazene molecules are synthesized through the reaction of a polyhydroxylated cyclotriphosphazene and a bifunctional acid chloride. The subunits of an exemplary set of polymers, the subunits namely being hexa-[3-tert-butyl-4-hydroxyphenoxy]cyclotri-phosphazene, facilitate the formation of the polyester. A detailed description of the preparation and characterization of the tert-butyl subunit is found in F. F. Stewart, *J. Appl. Polym Sci* 72: 1085–1090 (1999), and incorporated herein by reference.

Polyester formation is facilitated via nucleophilic acyl substitution (FIG. 2A), to form esterified trimeric subunits 20, 22. As noted supra, the trimer comprises a phosphazene molecule (partially depicted as element 11 in FIG. 2A), an aromatic moiety 13, and a tert-butyl side arm 15. The number of carbons comprising the "R" group of the acid chlorides determines the length of the "spacers" positioned intermediate the para-positions of adjacent aromatic moieties.

Figure 2A:
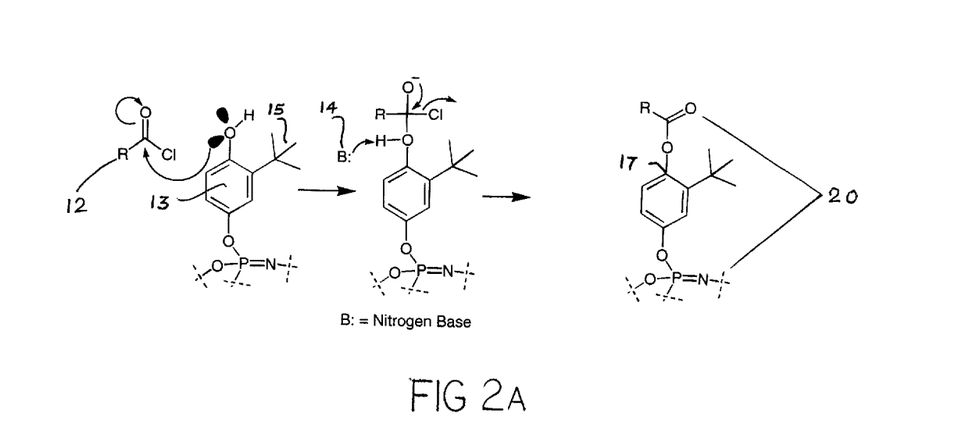
FIGS. 2A–2B are depictions of the esterification processes of trimer subunits, in accordance with features of the present invention.

Generally as to acyl substitution, and as depicted in FIG. 2A, the electrophilic acid chloride 12 reacts with the free hydroxyl group of the tert-hydroquinone. In conjunction with a nitrogen-containing base 14, the acid chloride substitutes on the hydroxyl oxygen.

It should be noted here the configurations of the subunits are not relegated to a tert-butyl substitution at the meta position of the hydroquinone, with the tert moiety directed away from the phosphazene molecule. Rather, substitutions at the ortho positions on the aromatic molecule also are suitable. As such, ortho or meta substitutions by an alkyl moiety can result in the alkyl group directed toward the phosphazene core (ortho substitution) or away from the phosphazene core (meta substitution).

It should also be noted that the subunits of the invented polyester are not relegated to tert-butyl substituted hydroquinones. Rather, a myriad of substituted hydroquinones are suitable, generally including, but not limited to alkylhydroquinones selected from the group consisting of methylhydroquinone, ethylhydroquinone, tert-butylhydroquinone, isopropyl hydroquinone, n-propylhydroquinone, isobutylhydro-quinone, and butylhydroquinone. Alkoxyhydroquinones also are suitable, including those selected from the group consisting of methoxyhydroquinone, ethoxyhydro-quinone, n-propoxyhydroquinone, isopropoxyhydroquinone, n-butoxyhydro-quinone, isobutoxyhydroquinone, and t-butoxyhydroquinone.

Halogenated alkylhydroquinones are suitable, including, but not limited to x-halomethydroquinones, x-haloethylhydroquinones, x-halo-n-propylhydroquinones, x-haloisopropyl-hydroquinones, x-halo-n-butylhydroquinones, x-haloisobutylhydroquinones, x-halo-t-butyl-hydroquinones, and combinations thereof, whereby the x is selected from the group consisting of mono, di, tri, tetra, penta, hexa, hepta, octa, nona, deca, undeca, dodeca, and combinations thereof.

Figure 3:
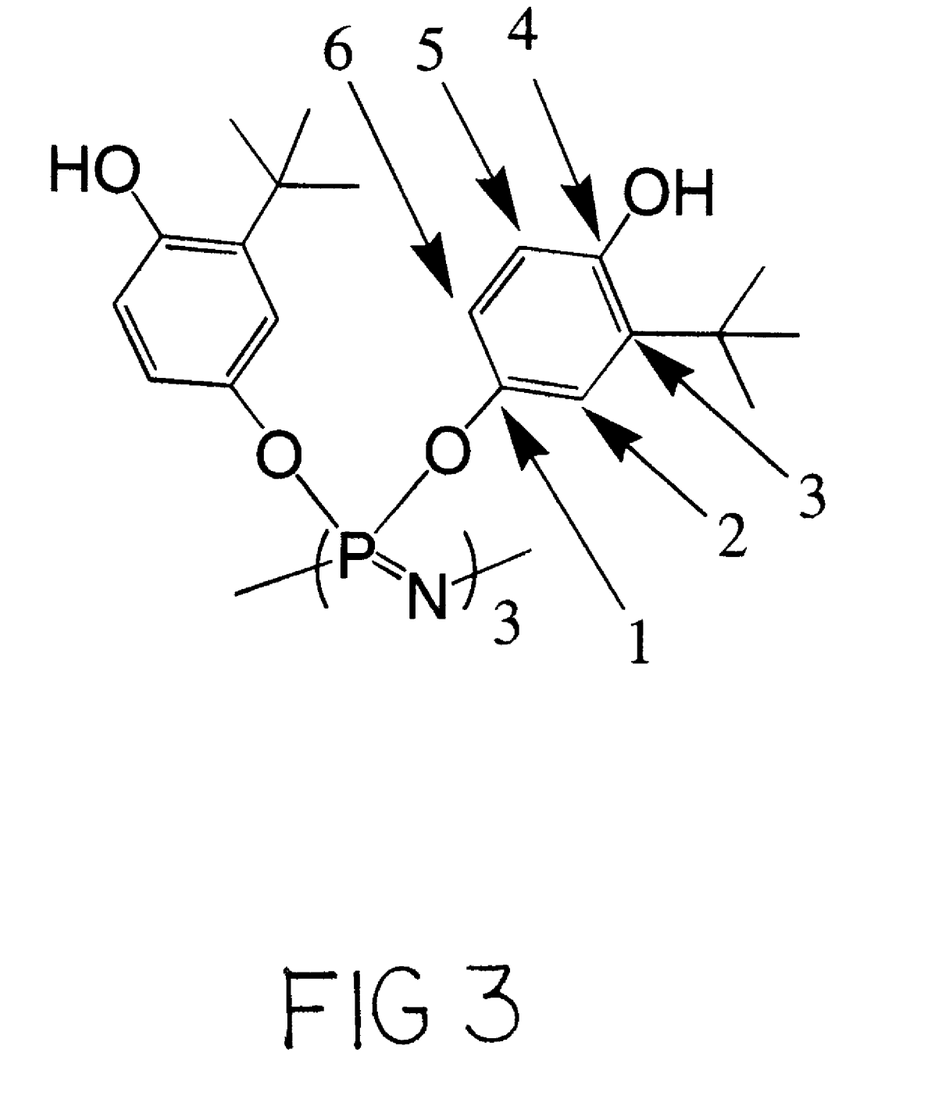
FIG. 3 is a depiction of the polyester molecule phosphazene-subunit, in accordance with features of the present invention.

To demonstrate the chemistry of the free hydroxyl of hexa-[3-tert-butyl-4-hydroxy-phenoxy]-cyclotriphosphazene (FIG. 3), nucleophilic displacement reactions were performed with both acetic anhydride and alkyl chlorides. At a hindered site (number 4) of the subject molecule, an hydroxyl moiety of hexa-[3-tert-butyl-4-hydroxy-phenoxy)]cyclotriphosphazene was found to react with bidentate acid chlorides to yield new high polymers. The phosphazene-containing polyesters were observed to have good solubility in polar organic solvents. Characterization of these new materials was performed using dilute solution laser light scattering techniques, thermal analysis, and NMR spectroscopy.

Nitrogen containing bases served as the acid acceptor in the invented polymerization protocol, such bases selected from the group consisting of 4-picoline, pyridine, triethylamine, and pyrimidine.

A $^{31}$P NMR spectrum of the hexa-[3-tert-butyl-4-hydroxyphenoxy]cyclotriphos-phazene molecular subunit showed only one resonance, in contrast to the hydroquinone analog. This is because crosslinking of cyclotriphosphazene rings is prevented through the steric hindrance provided by the tert-butyl group. Attachment of the tert-butylhydroquinone to the aromatic ring occurs in a regiospecific manner where the tert-butyl group is located exclusively in position 3.

Figure 4:
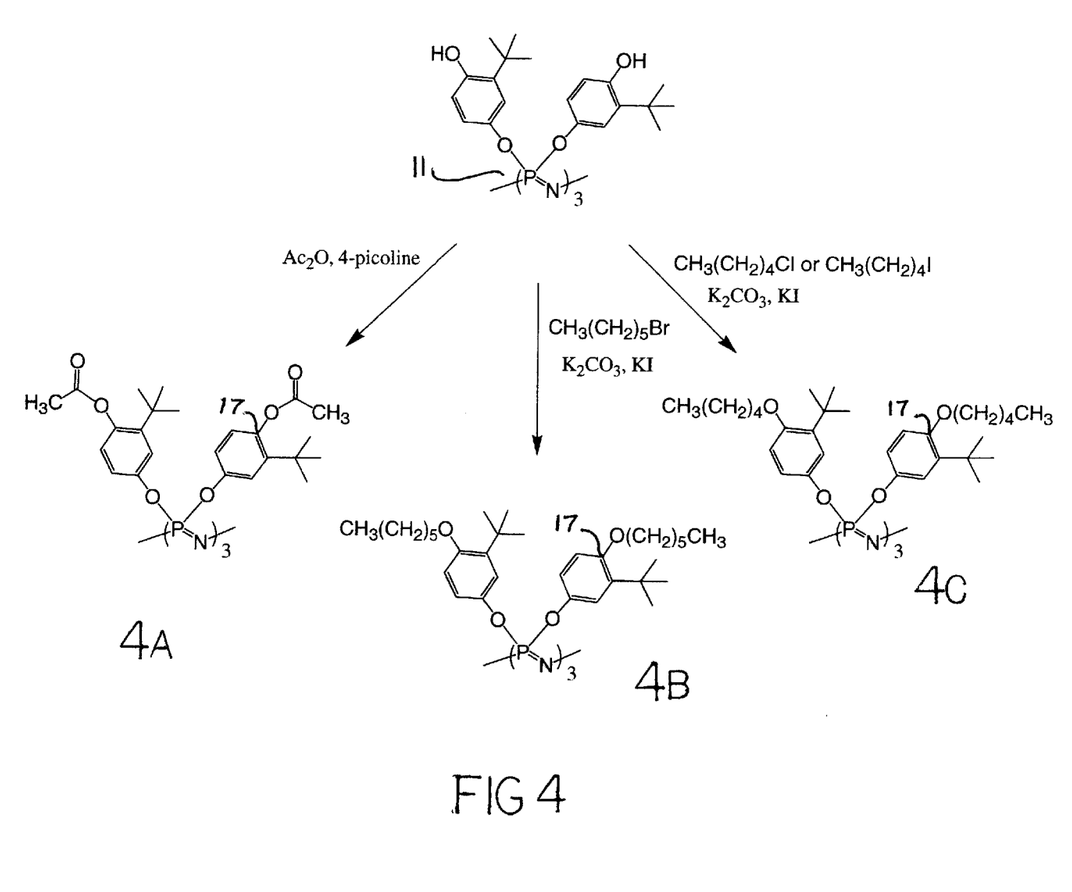
FIGS. 4A–4C are schematic diagrams illustrating the chemistry of the phospha-zene subunits used for creating the invented polyesters.

FIGS. 4A–4C depict the nucleophilic substitution chemistry associated with the tert-butyl substituted phosphazene subunit of the invented polyester macromolecules. Syntheses of macromolecules comprising crosslinked trimer subunits (depicted as numeral 12 in FIG. 4) occur in a facile manner with high yields. The free aromatic hydroxyl groups on the trimer afford synthetic pathways to optimize the chemistry of these systems.

Subunit Acetylation
Process Detail

The compound depicted in FIG. 4A was synthesized by reacting the tert-butyl subunit (FIG. 3) with acetic anhydride. The following bench-top protocol was utilized: A 50 mL flask was charged with 2.0 g (2.5 mmol) of hexa-[3-tert-butyl-4-hydroxyphenoxy]-cyclotriphosphazene, 30 mL of dry 1,4-dioxane, 1.6 mL (16 mmol) of 4-picoline, and a magnetic stirrer. To the reaction mixture was added 1.6 mL (17 mmol) of acetic anhydride and the reaction was stirred under ambient conditions for 2 hrs under nitrogen atmosphere. The reaction was then heated to reflux for 2.5 hrs and allowed to cool to room temperature. Isolation of the compound depicted in 4A was accomplished by quenching the excess anhydride with water followed by extraction of the product into $CH_2Cl_2$. The product was washed sequentially with three portions of dilute HCl and three portions of dilute aqueous $NaHCO_3$ to yield 0.9 g of a pale yellow solid (34 percent yield).

The resulting ester, Hexa-[4-acetyloxy-3-tert-butylphenoxy]cyclotriphosphazene, as depicted in FIG. 4A., had the following spectral fingerprint: $^{31}$P NMR (acetone-$d_6$) d 9.90 ppm. $^{13}$C NMR (acetone-$d_6$) d 169.4, 148.4, 147.0, 143.3, 126.1, 119.3, 117.2, 35.0, 30.0, 21.4. The protonated aromatic hydrocarbons (carbons 2, 5, and 6, See FIG. 3) were shifted to 117.2, 119.3 and 126.1 ppm, indicating complete acetylation. The expected carbonyl resonance, located at 169.4, also was observed. $^1$H NMR (acetone-$d_6$) d 7.27, 7.03, 6.84, 2.38, 1.34. DSC $T_g$ 65° C., TGA $T_d$ 370° C. A 74 percent yield was realized.

Hexa-[3-tert-butyl-4-hydroxyphenoxy] cyclotriphosphazene (FIG. 3) was of further interest for chemical modification due to the tert-butyl group, which increases its solubility in common solvents as compared to the hydroquinone-substituted compound. Furthermore, it is generally synthesized and isolated in greater yield than the hydroqui-none. The relatively non-polar characteristics of the butyl group facilitate separation into the organic phase. Use of the tert-butyl group eliminates the cross-linking that is inherent when the unsubstituted hydroquinone is used.

The chemistry of the tert-butyl phosphazene trimeric compound was probed under milder conditions through the reaction with alkyl halides with catalytic amounts of $K_2CO_3$ and KI. Reactions with 1-bromohexane in acetone generally required five days at reflux to obtain total conversion of 2 to hexa-(3-tert-butyl-4-n-hexanoxy-phenoxy) cyclotriphosphazene, FIG. 4B.

Figure 2B:
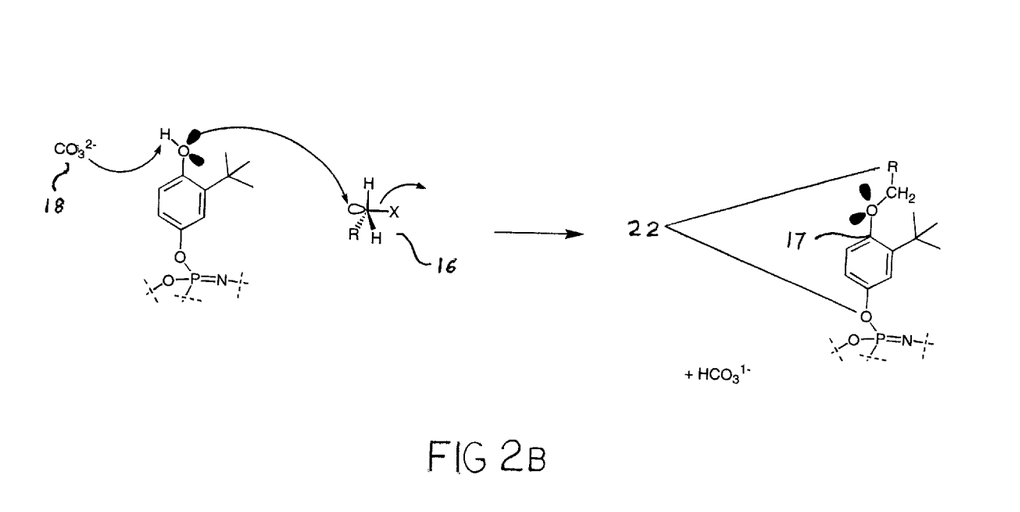

The most significant feature in the $^{13}$C NMR spectrum of the resulting compound (FIG. 4B) was the resonance assigned to carbon 4 observed at 155.7 ppm as compared to 152.4 ppm for the same position on the subunit (element numeral 12) indicating functionalization of the free hydroxyl. This reaction proceeds through deprotonation of the hydroxyl followed by nucleophilic attack on the alkyl halide wherein the halide is displaced (See FIG. 2B). No rearrangement of the molecule results. Analogous reactions with 1-iodopentane and 1-chloropentane were conducted to confirm this $S_N2$ behavior. Reaction with 1-iodopentane required five days at reflux for complete reaction, similar to that of 1-bromohexane. However, 1-chloropentane required significantly longer, up to three weeks, to complete, with the difference between the chloroalkane reaction and the bromo/iodoalkane reactions due to leaving group effects. These data fully support the $S_N2$ mechanism for this substitution reaction.

Subunit Alkylation
Process Detail

Ether subunits of the invented polyesters are depicted in FIG. 4B and 4C. They were synthesized by reacting the tert-butyl phosphazene subunit with alkyl halides using the following protocol: A 500 mL 3-neck flask equipped with a water condenser and a magnetic stir bar was charged with the tert-butyl phosphazene subunit (8.1 g, 7.2 mmol) and 1-bromohexane (61 mL, 430 mmol) and dissolved in acetone (200 mL). To the stirring solution, $K_2CO_3$ (20 g) and KI (0.3 g) were added and the mixture was heated to reflux under a flow of nitrogen for approximately 5 days. During this time, the reaction was monitored by $^{31}$P NMR spectroscopy. When the reaction was complete, the solids were removed by filtration.

Acetone in the filtrate was removed using a rotary evaporator followed by vacuum distillation to remove the unreacted 1-bromohexane. The residual oil was chromatographed on a silica gel column using n-hexanes: ethyl acetate as the eluent (6:1 by volume). After rotary evaporation of the eluent, a highly viscous honey colored oil was obtained (23% yield). The ether depicted in FIG. 4B, Hexa-[3-tert-butyl-4-n-hexanoxyphenoxy]cyclotriphosphazene, resulted. The spectral fingerprint of the ether subunit is as follows: $^{31}P$ NMR (acetone-$d_6$) d 10.7. $^{13}C$ NMR (acetone-$d_6$) d 155.7, 145.2, 139.6, 120.5, 119.5, 113.1, 69.0, 35.6, 32.4, 30.4, 30.2, 27.0, 23.4, 14.4. $^1H$ NMR (acetone-$d_6$) d 7.03, 6.68, 3.95, 1.84, 1.54, 1.37, 1.30, 0.92. Analysis calculated for $C_{96}H_{150}N_3P_3O_{12}$: C, 70.69; H, 9.27; N, 2.58. Observed: C, 67.54; H, 9.03; N, 2.70.

Regarding the ether subunit depicted in FIG. 4C, a similar procedure to that disclosed in the previous paragraph was followed using 1-chloropentane and 1-iodopentane. Reaction times for 1-chloropentane and 1-iodopentane with the tert-butyl phosphazene subunit were 3 weeks and 5 days, respectively. A pale yellow solid was obtained after purification (yield 36% (chloride) and 62% (iodide)). The NMR data of the product for these two reactions were identical. The ether depicted in FIG. 4C, Hexa-[3-tert-butyl-4-n-pentanoxyphenoxy]cyclotriphosphazene, has the following spectral fingerprint: $^{31}P$ NMR (toluene-$d_8$) d 11.09. $^{13}C$ NMR (toluene-$d_8$) d 155.4, 145.6, 139.4, 121.0, 119.6, 112.8, 68.5, 35.6, 30.4, 30.0, 29.3, 23.2, 14.6. $^1H$ NMR (toluene-$d_8$) d 7.39, 7.12, 6.47, 6.44, 3.58, 1.64, 1.41, 1.31, 0.88. Analysis calculated for $C_{90}H_{138}N_3P_3O_{12}$: C, 69.88; H, 8.99; N, 2.72. Found: C, 69.09; H, 8.94; N, 3.27 and C, 68.57; H, 8.93; N, 3.06.

Linker Detail

Generally, all of the hydroquinone-substituted aromatic spacers discussed herein are at the R' positions depicted in FIG. 1.

The above-discovered reactivity of the tert-butyl substituted phosphazene molecule (the phosphazene core molecule partially depicted as 11) towards an acid anhydride, as depicted in FIG. 4, illustrates that bifunctional organic linkers can be utilized to form diesters in order to produce polymerization products of the starter molecule. Such bifunctional linkers include diacid chlorides. A reaction between a polyhydroxylated cyclotriphosphazene and a diacid chloride produces cyclomatrix phosphazene polyesters, having the generalized structure depicted in FIG. 5, and discussed infra.

A myriad of diacid chlorides can be utilized, including, but not limited to adipoyl chloride, dodecanedioyl chloride, succinyl chloride, sebacoyl chloride, heptanedioyl chloride, stearoyl chloride, and combinations thereof.

Generally, the diester linkages are juxtaposed intermediate the para positions of two aromatic molecules 13 so that each end of the ester is attached to para carbons 17 of adjacent aromatic molecules. In IUPAC terminology, the ester linkages are at the 4 position of the aromatic moiety, with respect to the phosphorus bearing oxygen of the phosphazene molecule. The inventors found that the length of the spacers between phosphazene rings confers different morphologies. Spacers of between 2 and 20 carbons in length are suitable. Short spacers (i.e. those having between 2 and 6 carbons) generally formed polymers that were glassy and fully soluble in solvents such as THF and acetone. A suitable two-carbon spacer is succinyl chloride. A suitable four-carbon spacer is adipoyl chloride.

Longer spacers (i.e., those in excess of 8 carbons) imparted a waxy character onto the polymer that was an embodiment of the physical properties of this longer component. A suitable 10-carbon spacer is dodecanedioyl chloride. A suitable 16-carbon spacer is stearoyl chloride.

Reactions were conducted with a three-fold excess of adipoyl chloride in 1,4-dioxane under refluxing conditions and were monitored by $^{13}C$ NMR spectroscopy. In this solvent, a polymer, FIG. 5, n=4, called Polyester 4 was synthesized as a brown glass-like solid. High solubility in THF and chloroform afforded detailed liquid state analysis of polymer. The observed shift of the protonated aromatic carbons was consistent with acetylated product, FIG. 4A. Additionally, two peaks at 174.0 ppm and 171.3 ppm were noted. From analogy to the acetylation reactions, the peak at 171.3 ppm was assigned to the ester carbonyl and the peak at 174.0 ppm was assigned to a free acid functionality (COOH).

The attachment of adipoyl chloride occurs both in a bidentate pathway forming a crosslink between two cyclotriphosphazene rings and in a monodentate fashion wherein one end of the diacid chloride attaches to the phosphazene and the other end is hydrolyzed during product purification.

Spectral deconvolution of carbonyl peaks revealed that they have approximately equal area suggesting that the average polymer subunit contains three monodentate pendant groups and three crosslinking pendant groups.

Laser Light-Scattering (LLS) was employed to determine the $M_w$ for Polyester 4, measured at 330,000 daltons evidencing a high degree of bidentate linkages between cyclotriphosphazene rings (See Table 1, infra).

TABLE 1

Thermal and Molecular Weight Characterization Data for Polyesters with spacers containing 2–10 carbons.

| Polyester | $M_w$ (× $10^5$ g/mol) | $M_w/M_n$ | $T_g$ (° C.) | $T_l$ (° C.) | $T_m$ (° C.) | $T_d$ (° C.) |
|---|---|---|---|---|---|---|
| 4[1] | 3.3 ± 1.0 | — | None observed | 61 | None observed | 161 |
| 2 | 3.46 ± 0.03 | 1.39 | None observed | 71 | None observed | 207 |
| 10 | 13.9 ± 6 | 1.99 | 14 | 53 | 115 | 207 |
| 10* | 12.2 ± 5 | 3.03 | 21 | 56 | 116 | 201 |

Using the $^{13}C$ NMR carbonyl peak areas, an estimation of the average number of polymers subunits per chain was calculated at 247. This was accomplished by using the relative peak areas to estimate the percentages of both mono- and bidentate pendant groups on an average cyclotriphosphazene ring. From this, an average molecular weight per polymer subunit was calculated, thus the estimated numbers of polymer subunits is equal to the $M_w$ divided by the molecular mass of the polymer subunit. Thermal analysis of Polyester 4 showed only a $T_1$ endotherm at 61° C. and that onset of thermal decomposition begins at 161° C. The most notable feature of this new polymer is the high degree of solubility in organic solvents, a property that is not common for cyclomatrix phosphazenes.

Adipoyl Chloride
Process Detail

Figure 5:
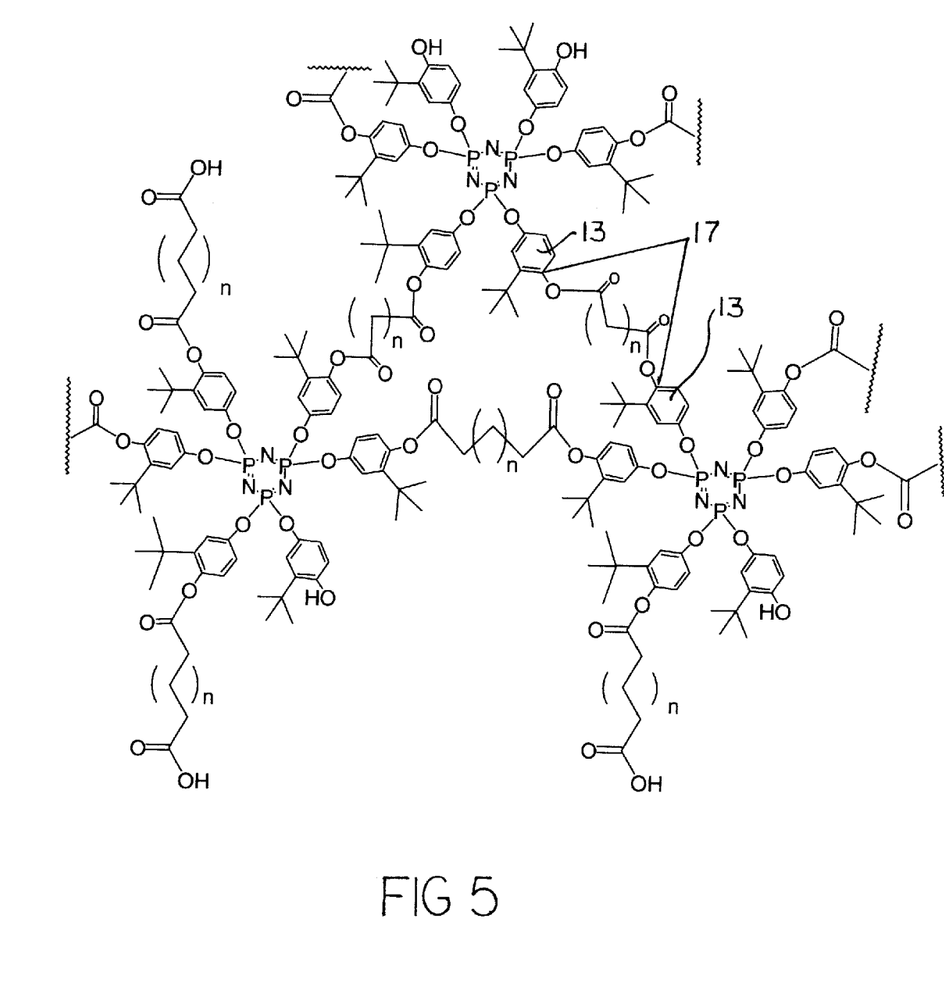
FIG. 5 is a generalized diagram of a polyester formed via reaction of tertbutyl phosphazene subunits with diacid chlorides, in accordance with features of the present invention.

The tert-butyl phosphazene subunit was reacted with adipoyl chloride to yield the compound depicted in FIG. 5 when n=4. The following protocol was followed: To a 25 mL flask was added a magnetic stirrer, 1.0 g (0.89 mmol) of the tert-butyl subunit and 10 mL of dry 1,4-dioxane. A condenser with an addition adapter was added and the apparatus was sealed with septum stopper and flushed with dry nitrogen. To this, 3.87 mL (27 mmol) of adipoyl chloride was added by syringe and the resulting mixture was heated to reflux for 6 hours. After cooling, the resulting mixture was added to a 250 mL separatory funnel containing 50 mL of water. The aqueous solution was extracted with three 50 mL portions of diethyl ether.

The organic phases were collected and the diethyl ether was stripped using a rotary evaporator to yield a brown solid. It was produced at 27 percent yield. The polymer has the following spectral fingerprint: 31P NMR (acetone-d6) d 9.90. $^{13}$C NMR (acetone-$d_6$) d 174.0, 171.3, 147.4, 146.1, 142.4, 125.2, 119.1, 118.4, 66.5, 65.1, 34.1, 32.9, 27.0. DSC $T_1$ 62° C. TGA $T_d$ 161° C. Dilute Solution LLS $M_w$ $(3.3\pm1.0)\times10^5$, RMS Radius $152.0\pm37.5$ nm, dn/dc =0.121 mL/g.

An investigation into shorter chain length bridges was investigated using succinyl dichloride. The reaction time was 48 hours and the product polymer, FIG. 5, when n=2, Polyester 2 was isolated as a tan colored brittle glassy solid. Thermal analysis indicated a $T_1$ endotherm at 71° C. and decomposition weight loss beginning at 207° C. Similar to 4, $^{13}$C NMR spectra data showed the same general trend with three peaks for the protonated aromatic carbons at positions 2, 5, and 6 and two peaks in the carbonyl region (ester and acid). Molecular weight characterization of this polymer was accomplished through High Performance Size Exclusion Chromatography (HPSEC) with Laser Light Scattering (LLS) detection. The degree of polymerization was similar to that of Polyester 2 as depicted in FIG. 5, n=2, with approximately 191 polymer subunits per chain as estimated from the $^{13}$C NMR spectrum.

Succinyl Chloride
Process Detail

The tert-butyl-containing phosphazene subunit was reacted with succinyl chloride to yield the polymer depicted in FIG. 5, when n=2, Polyester 2. To a dry 50 mL flask was added 2.0 g (1.78 mmol) of tert-butyl substituted phosphazene subunit 12, 30 ml of dry 1,4-dioxane, and a magnetic stirrer. A condenser with an addition adapter was added and the apparatus was sealed with septum stopper and flushed with dry nitrogen. Succinyl chloride (5.9 mL, 53.5 mmol) was added by syringe and the resulting mixture was heated to reflux for 48 hr upon which the excess succinyl chloride was quenched with water and the Polymer was isolated by extraction with $CH_2Cl_2$. Removal of the $CH_2Cl_2$ afforded a tan colored solid that was purified by extraction of impurities with hot water in a soxhlet extractor to give 0.7 g (51 percent yield) of the polymer, Polyester 2. The spectral fingerprint of the polymer is as follows: $^{31}$P NMR (acetone-$d_6$) d 9.95. $^{13}$C NMR (acetone-$d_6$) d 173.2, 171.2, 148.1, 146.5, 142.9, 125.4, 119.6, 118.8, 34.6, 28.5. DSC T. 71° C. TGA $T_d$ 207° C. HPSEC-LLS $M_w$ $(3.46\pm0.03) \times10^5$, RMS radius $73.4\pm0.7$, polydispersity $(M_w/M_n)$ $1.39\pm0.02$.

Reactions with dodecanedioyl chloride were observed to give waxy polymeric products, FIG. 5 when n=10, wherein the waxy nature of the products attributed to the increased aliphatic carbon content of the diacid. These polymerizations were performed at three different stoichiometries to investigate the effect that the synthetic process has on molecular weight. Ratios of diacid chloride to aromatic hydroxyl studied included 1.0:1, 2.0:1, and 3.5:1. At ratios of 2.0:1 and 3.5:1, soluble polymers were isolated and characterized. Molecular weights ($M_w$) for these species were measured in the $10^6$ range and confirmed the polymeric nature of the products. Additionally, through deconvolution of the carbonyl resonances in the $^{13}$C NMR spectra, the average number of mers per polymer chain was estimated at 826 and 678, respectively, for two different polymers of the type n=10 as depicted in FIG. 5. The one with 826 mers is designated as 10 and the one with 678 mers as 10*.

The degree of polymerization for the two polymers, 10 and 10*, of the type, Polyester 10, FIG. 5, n=10, are clearly higher than for the shorter chain crosslinkers by a factor of three. A potential explanation for this behavior is that the longer crosslinkers allow the phosphazene ring to be distant as compared to the shorter chain systems, thus minimizing steric encumbrance and encouraging a higher degree of polymerization. The degree of polymerization for Polyester 10 is greater than the degree of polymerization for Polyester 10* due to the higher proportion of diacid chloride used in the synthesis of Polyester 10.

Thermal analytical data of the two type 10 polyesters were similar to each other, as expected. The significant difference between the polymer data observed for the shorter chain systems and for the two type 10's was a measurable $T_g$. The $T_g$ for 10 and 10* was 14° C. and 21° C., respectively. Additionally, two $T_1$ endotherms were observed. The higher of these two $T_1$'s was attributed to a melt transition (Tm). Polyesters 2 and 4 decomposed before they could melt. The increased amount of carbon in the $C_{12}$ linkers gave 10 and 10* lower melting points such that they could be observed at temperatures lower than the $T_d$. Onset of decomposition $(T_d)$ for both of these polymers was measured in excess of 200° C.

Dodecanedioyl Dichloride
Process Detail

The polyesters 10 and 10*, FIG. 5, n=10, were synthesized using a similar method. Polyester 10 was synthesized with a ratio of acid chloride/aromatic hydroxyl on phosphazene of 3.5 and for Polyester 10* the ratio was 2.0 The representative synthesis of Polyester 10 is included here. To a 100 mL flask was added 5.53 g (4.92 mmol) of the tert-butyl phosphazene subunit, 50 mL of dry 1,4-dioxane, a magnetic stirrer, an addition adapter, and a condenser. The system was sealed with septum stopper and purged with dry nitrogen. To this apparatus was added by syringe 12.9 mL (51.6 mmol) of dodecanedioyl dichloride and the resulting mixture was heated for 22 hours and then allowed to cool to room temperature. The excess dichloride was quenched with 1 L of water and the insoluble solids were collected by centrifugation. These solids were then treated with 100 mL of diethyl ether and centrifuged to remove insoluble material. The solution was collected by decantation and the polymer depicted in FIG. 5, n=10, Polyester 10 was isolated by removal of solvent to give 6.9 g (60%) yield) of a tan solid. For the polymers 10 and 10*, part of the spectral fingerprint is the same, and is as follows: $^{31}$P NMR (acetone-$d_6$) d 10.0. $^{13}$C NMR (acetone-$d_6$) d 174.9, 172.0, 148.2, 146.9, 143.1, 125.9, 119.9, 119.2, 34.9, 34.0, 25.3. For Polyester 10, FIG. 5, n=10,: DSC $T_g$ 14° C., $T_1$ 53° C., $T_m$ 115° C. TGA $T_d$ 207° C. HPSEC LLS $M_w$ (1.39±0.6)×10⁶, RMS radius 103.9±24.9 nm, polydispersity ($M_w/M_n$) 1.99. For Polyester 10*, FIG. 5, n=10,: DSC $T_g$ 21° C., $T_1$ 56° C., $T_m$ 116° C. TGA $T_d$ 201° C. HPSEC LLS $M_w$ (1.22±0.5)× 10⁶, RMS Radius 103.4±20.9 nm.

In summary, new cyclomatrix phosphazene polymers were synthesized from the reaction between bifunctional halides and substituted hydroquinonecyclotriphospha-zene. Acid chlorides, both mono- and bidentate, serving as cross-linkers for adjacent phosphazene moieties, readily reacted with the hindered hydroxyl of the tert-butyl substituted phosphazene. Materials synthesized in this work were formed using three different chainlengths of organic crosslinker. An advantage of the shorter organic crosslinkers, four and six carbons long, is to give polymers that are very glassy, do not have a glass transition temperature in the range of −150° C. and +220° C. and are fully soluble in solvents such as THF and acetone. The longer aliphatic $C_{12}$ (n=10) chain imparted a waxy character onto the polymer that was an embodiment of the physical properties of this longer component.

While the invention has been described with reference to details of the illustrated embodiment, these details are not intended to limit the scope of the invention as defined in the appended claims.

The embodiment of the invention in which an exclusive property or privilege is claimed is defined as follows:

1. A polyester comprising:
 a) phosphazene molecules;
 b) aromatic molecules attached to the phosphazene molecules; and
 c) esters linking adjacent aromatic molecules to each other.

2. The polyester as recited in claim 1 wherein the aromatic molecules are substituted with alkyl moieties, or alkyloxy moieties, or aromatic moieties, or halogenated moieties, or combinations thereof.

3. The polyester as recited in claim 1 wherein the aromatic molecules are substituted hydroquinones.

4. The polyester as recited in claim 3 wherein the substituted hydroquinoneare alkylhydroquinones selected from the group consisting of methylhydroquinone, ethylhydroquinone, tert-butylhydroquinone, isopropylhydroquinone, n-propylhydro-quinone, isobutylhydroquinone, and butyihydroquinone.

5. The polyester as recited in claim 3 wherein the substituted hydroquinones are alkoxyhydroquinones selected from the group consisting of: methoxyhydroquinone, ethoxyhydroquinone, n-propoxyhydroquinone, isopropoxyhydroquinone, n-butoxyhydroquinone, isobutoxyhydroquinone, and t-butoxyhydroquinone.

6. The polyester as recited in claim 3 wherein the substituted hydroquinones are halogenated alkylhydroquinones selected from the group consisting of halo-methylhydroquinone, halo-ethylhydroquinone, halo-n-propylhydroquinone, halo-isopropylhydroquinone, halo-n-butylhydroquinone, halo-isobutylhydroquinone, halo-t-butylhydroquinone, and combinations thereof.

7. The polyester as recited in claim 1 wherein the esters are diesters containing from 2 to 18 carbons.

8. The polyester as recited in claim 1 wherein the esters are attached to para carbons of adjacent aromatic molecules.

9. The polyester as recited in claim 1 wherein the esters are chlorides selected from the group consisting of adipoyl chloride, dodecanedioyl chloride, succinyl chloride, sebacoyl chloride, heptanedioyl chloride, stearoyl chloride, and combinations thereof.

10. A method for synthesizing polyesters containing phosphazene, the method comprising reacting hexa-(alkyl hydroquinone)cyclotriphosphazene in a nonaqueous solvent with a bifunctional acyl halide.

11. The method as recited in claim 10 wherein the nonaqueous solvent is an etheric solvent selected from the group consisting of 1,3-dioxane, 1,4-dioxane, tetrahydrofuran, and acetone.

12. The method as recited in claim 10 wherein the nonaqueous solvent is an aromatic solvent selected from the group consisting of anisole, benzene, bromobenzene, chlorobenzene, toluene, o-xylene, m-xylene, p-xylene, ethylbenzene, isopropylbenzene, and combinations thereof.

13. The method as recited in claim 10 wherein the alkyl hydroquinone is isopropyl hydroquinone, n-propylhydroquinone, t-buytlhydroquinone, isobutylhydroquinone, n-butylhydroquinone, methoxyhydroquinone, ethoxyhydroquinone, n-propoxyhydroquinone, isopropoxyhydroquinone, n-butoxyhydroquinone, isobutoxyhydroquinone, and t-butoxyhydroquinone and combinations thereof.

14. The method as recited in claim 10 wherein the bifunctional acyl halide contains between 2 and 18 carbon atoms.

15. The method as recited in claim 10 wherein the bifunctional acyl halide is adipoyl chloride, or succinyl chloride, or dodecanedioyl chloride, or sebacoyl chloride, or heptanedioyl chloride, or stearoyl chloride.

16. The method as recited in claim 10 wherein the bifunctional acyl halide is present in a molar ratio to the phosphazene of between 1.5:1 and 100:1.

* * * * *